(12) United States Patent
Porzio et al.

(10) Patent No.: US 12,223,204 B2
(45) Date of Patent: Feb. 11, 2025

(54) MEMORY-ALIGNED ACCESS OPERATIONS

(71) Applicant: Micron Technology, Inc., Boise, ID (US)

(72) Inventors: Luca Porzio, Casalnuovo (IT); Dionisio Minopoli, Frattamaggiore (IT); Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 20 days.

(21) Appl. No.: 18/080,568

(22) Filed: Dec. 13, 2022

(65) Prior Publication Data

US 2023/0195387 A1 Jun. 22, 2023

Related U.S. Application Data

(60) Provisional application No. 63/291,769, filed on Dec. 20, 2021.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2009/0182976 A1* | 7/2009 | Agesen | G06F 12/1009 711/E12.059 |
| 2009/0193184 A1* | 7/2009 | Yu | G06F 12/0246 711/E12.001 |
| 2012/0246415 A1* | 9/2012 | Teo | G06F 12/0246 711/E12.001 |
| 2014/0082323 A1* | 3/2014 | Li | G06F 12/0246 711/207 |
| 2016/0342342 A1* | 11/2016 | Kan | G06F 12/0802 |
| 2020/0150898 A1* | 5/2020 | Byun | G06F 3/064 |
| 2020/0356307 A1* | 11/2020 | Subbarao | G06F 3/0659 |
| 2022/0058125 A1* | 2/2022 | Lee | G06F 12/0882 |
| 2022/0156106 A1* | 5/2022 | Zhang | G06F 9/5016 |
| 2022/0188245 A1* | 6/2022 | Sandberg | G06F 12/1009 |
| 2022/0269440 A1* | 8/2022 | Lin | G06F 3/0604 |
| 2023/0289078 A1* | 9/2023 | Wells | G06F 12/0246 |

* cited by examiner

*Primary Examiner* — Yaima Rigol
(74) *Attorney, Agent, or Firm* — Holland & Hart LLP

(57) ABSTRACT

Methods, systems, and devices for memory-aligned access operations are described. A target packet size based on a quantity of physical pages addressable by individual first-level pages of a first-level page table for mapping logical address to respective physical pages may be indicated to a host system. A buffer may be configured based on the target packet size and data for an application at the host system and associated with the target packet size may be stored in the buffer. Based on a utilization threshold of the buffer being reached, a set of data stored in the buffer and having the target packet size may be written to a memory device, where a set of physical addresses for storing the set of data may be identified based on a second-level entry of a second-level page.

17 Claims, 8 Drawing Sheets

MEMORY-ALIGNED ACCESS OPERATIONS

CROSS REFERENCE

The present Application for Patent claims the benefit of U.S. Provisional Patent Application No. 63/291,769 by PORZIO et al., entitled "MEMORY-ALIGNED ACCESS OPERATIONS" and filed Dec. 20, 2021, each of which is assigned to the assignee hereof, and each of which is expressly incorporated by reference in its entirety herein.

FIELD OF TECHNOLOGY

The following relates generally to one or more systems for memory and more specifically to memory-aligned access operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
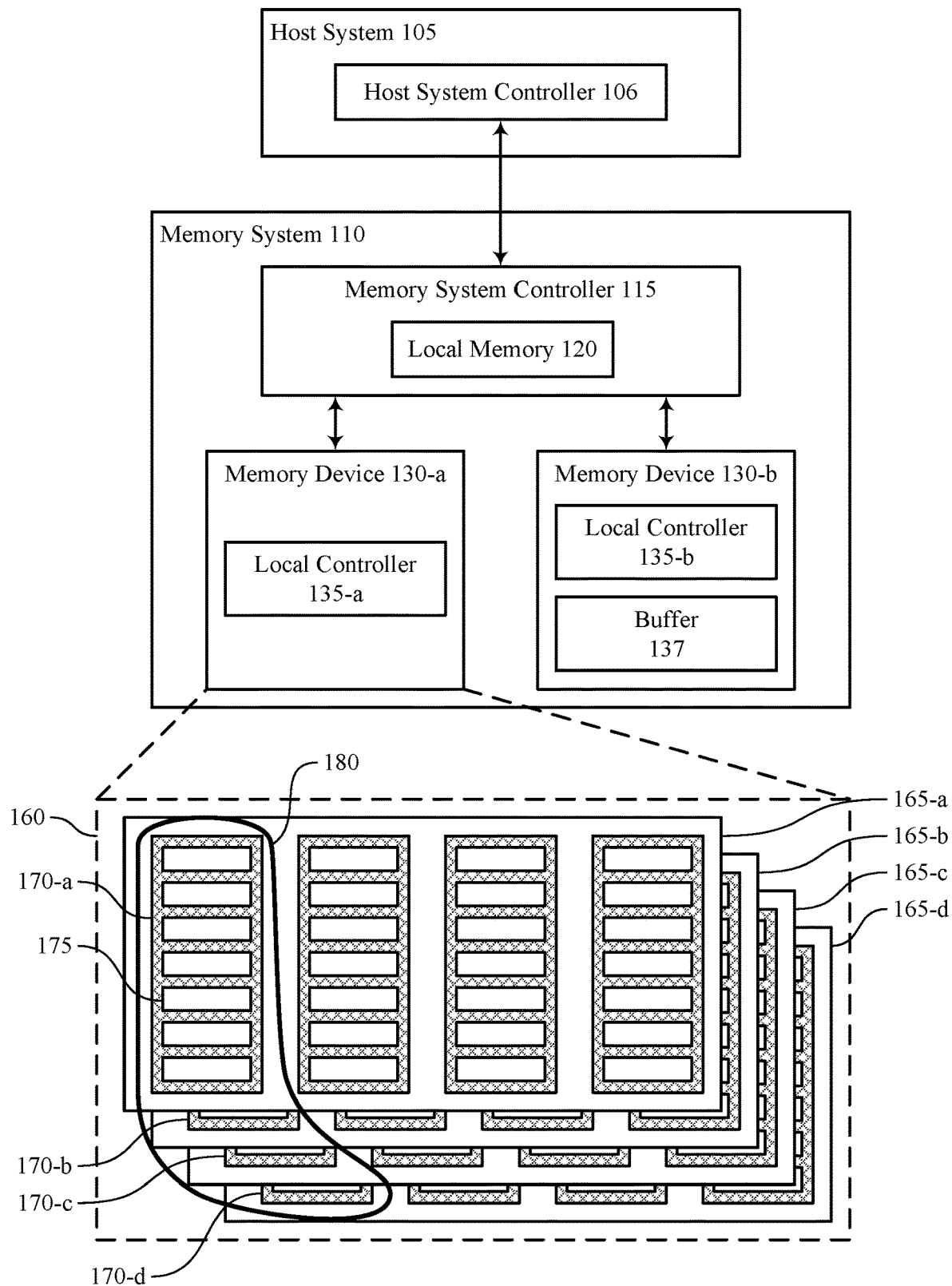
FIG. 1 illustrates an example of a system that supports memory-aligned access operations in accordance with examples as disclosed herein.

An application at a host system may process or generate a continuous stream of data. For example, a recording application (e.g., a black box application) may process a continuous stream of sequential (e.g., chronological) data received from connected audio, recording devices, visual recording devices, or one or more sensors. Such applications may be constantly generating or processing new data. Accordingly, a host system may be continuously storing new data for the application at a memory device—e.g., in a same order as the data is generated or processed. In some examples, the host system may store the data in a portion of the memory device that is allocated to the application.

An operating life of memory cells (including NAND memory cells) may depend at least in part on a quantity of program/erase cycles performed on the memory cell. Due to capacity constraints (e.g., once a utilization of the set of resources reaches a threshold), for applications that continuously generate or process data, a host system may constantly overwrite data stored in a memory system to enable the storage of the new data obtained at the host system—e.g., once a utilization threshold of an allocated set of resources is reached. Accordingly, the allocated sets of resources may be subjected to a high rate of program/erase cycles—e.g., relative to other resources in the memory system. Moreover, inefficient storage of the data for such an application in a memory device may result in an even larger quantity of program/erase cycles and an increased quantity of operations for loading and unloading mapping tables into a volatile memory device at the memory system. Accordingly, storing data for continuous storage applications (e.g., a black box application) may result in a memory device reaching an end of its operating life in an accelerated timeline—e.g., in less than 15 years.

To increase an operating life of a memory device that supports a continuous storage application, enhanced techniques for increasing an efficiency of operations for writing to the memory device may be used. For example, a host system may generate data packets having a size that is tailored to a memory device of a memory system. In some examples, the memory system may indicate to the host system a preferred size for the data packets based on an architecture of the memory device—e.g., based on a physical page size, a size of a logical page in a logical table, etc. The host system may use the preferred size when generating packets tailored to the memory device.

In some examples, the memory system may additionally or alternatively indicate that data packets issued by the host should be aligned to the preferred size, and the host system may issue write commands to the memory device based on generating a data packet that is of the preferred size and that is aligned to the preferred size. In some cases, aligning a data packet to the preferred size may be or include assigning to the data packet a logical address that corresponds to an initial (e.g., lowest, first) logical address mapped by a lowest level page of a logical-to-physical (L2P) mapping table, such that the data packet may be of a size and correspond to a logical address range such that the entire data packet may be stored at a set of physical addresses mapped to by a single lowest level page of the L2P table, with the data packet beginning at a physical address corresponding to a lowest logical address mapped to by the single lowest level page of the L2P table and ending at a physical address corresponding to a lowest logical address mapped to by the single lowest level page of the L2P table. Such alignment to the preferred size may be achieved, in some examples, by assigning to the data packet a logical address that is an integer multiple of the preferred size.

Features of the disclosure are initially described in the context of a system. Features of the disclosure are described in the context of a system architecture, process flow, and resource diagram. These and other features of the disclosure are further illustrated by and described in the context of an apparatus diagram and flowchart that relate to memory-aligned access operations.

FIG. 1 illustrates an example of a system 100 that supports memory-aligned access operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random-access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory, computer readable media that support memory-aligned access operations. For example, the host system 105, the memory system controller 115, or a memory device 130 (e.g., a local controller 135) may include or otherwise may access one or more non-transitory, computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A host system 105 may be configured to run one or more applications. The one or more applications at host system 105 may include one or more applications that are used to record data. For example, a host system 105 that is implemented in an automotive vehicle may include an application that is configured to receive audio data obtained by one or more microphones installed at the automotive vehicle, visual data (e.g., video, photos, etc.) obtained by one or more cameras installed at the automotive vehicle, automotive data (e.g. speed, tire pressure, oil pressure, brake fluid pressure, etc.) obtained by one or more sensors installed at the automotive vehicle, and the like. The host system 105 may be further configured to store the obtained data for a duration. That is, the host system 105 may be configured to record the obtained data. Such an application may in some cases be referred to as a black box application. The host system 105 may similarly be implemented at other types of vehicles—e.g., a nautical vehicle, aeronautical vehicle, etc. In some examples, the host system 105 may be similarly at other types of structure (e.g., a weather observation device, a wildlife monitoring device, etc.).

The host system 105 may use a memory system 110 to store data obtained, processed, or generated at host system 105. In some examples, the host system 105 continuously stores new data in the memory system 110 as it is obtained. The host system 105 may send the new data to the memory system 110 in packets of varying sizes—e.g., on an ad hoc basis. In some examples, the memory system 110 allocates a set of resources (e.g., a set of physical addresses corresponding to a set of pages 175 of one or more memory devices 130) to the application for storage of data generated by the application. The memory system 110 may store data for the application that is received from the host system 105 at the set of resources.

In some examples, the memory system 110 performs sequential access operations to store the data in one or more of the memory devices 130. Sequential access operations may include writing a set of data to a set of complementary pages 175 in different planes 165 of a memory device, in different memory devices, or both. Sequential access operations may be performed more efficiently than non-sequential access operations (which may also be referred to as random access operations). In some examples, sequential access operations are used to store sequential data—e.g., data that is generated and stored by an application in a chronological order, such as captured audio data, captured video data, captured temperature data, streaming media data, etc. In such cases, a host system 105 may write the sequential data to sequential logical addresses, and the memory system 110 may write the sequential data to sequential physical addresses corresponding to the sequential logical addresses. In addition to improving a performance of the memory system 110, sequential access operations may extend an operating life of the memory system 110—e.g., based on facilitating improved data organization, decreasing defragmentation operations, etc.

An operating life of memory cells (including NAND memory cells) may be based on a quantity of program/erase cycles performed on the memory cell. Due to capacity constraints (e.g., once a utilization of the set of resources reaches a threshold), for applications that continuously generate or process data, the host system 105 may constantly overwrite data stored in the memory system 110 to enable the storage of the new data obtained at the host system 105—e.g., once a utilization threshold of the allocated set of resources is reached. Accordingly, the allocated sets of resources may be subjected to a high rate of program/erase cycles—e.g., relative to other resources in memory system 110. Moreover, inefficient storage (e.g., non-sequential storage) of the data for such an application in a memory device 130 may result in an even larger quantity of program/erase cycles. Accordingly, storing data for continuous storage applications (e.g., a black box application) may result in a memory device 130 reaching an end of its operating life in an accelerated timeline—e.g., in less than 15 years.

To increase an operating life of a memory device that supports a continuous storage application, enhanced techniques for increasing an efficiency of operations for writing to the memory device may be used. For example, a host system may generate data packets having a size that is tailored to a memory device of a memory system. In some examples, the memory system may indicate to the host system a preferred size for the data packets based on an architecture of the memory device—e.g., based on a physical page size, a size of a page in a physical page table, etc. In some examples, the memory system may indicate to the host system that the data packets, issued to the memory system, are to be aligned to the preferred size. The host system may use the preferred size when generating the packets that are tailored to the memory device.

A memory system controller 115 may indicate to a host system 105 a target packet size (e.g., a preferred packet size, an optimized packet size) for storing data generated or processed by an application at the host system 105. In some examples, the application may generate a continuous stream of sequential (e.g. chronological) data—e.g., an application that records aspects of an ambient environment. The target packet size may be based on a quantity of physical pages that is addressable by an individual lower-level page of a lower-level page table (e.g., of an L2P table) used to map logical addresses to respective physical pages of a memory device 130 and a size of a physical page. That is, the target packet size may be based on a quantity of entries in a lower-level page (e.g., of an L2P table) and a size of a physical page within the memory device 130. Based on receiving the indication, the host system 105 may configure a buffer 137 in accordance with the target packet size, where the buffer 137 may be used to store data for the application. The buffer 137 may be configured to have a size that is greater than or equal to the target packet size. In some examples, the buffer 137 is included within a memory device 130-b, within the host system 105, or external to the host system 105 and the memory system 110.

Based on the buffer 137 being configured, the host system 105 may begin storing data for the application in the buffer 137. Based on a utilization of the buffer 137 reaching a threshold (e.g., based on the buffer 137 becoming full), the host system 105 may direct the memory system 110 to store the set of data stored in the buffer 137 in a memory device 130-a—e.g., based on transmitting a command to the memory system 110 that includes a logical address for storing the set of data. Based on the logical address, the memory system 110 may identify a higher-level entry of a higher-level page table that points to a lower-level page of the lower-level page table, where lower-level entries of the lower-level page table map a set of logical addresses (including the received logical address) to a set of physical addresses. Further, based on the higher-level entry, the memory system 110 may write the set of data to the set of physical addresses.

By configuring the host system 105 to configure a buffer 137 having a size (a preferred packet size) that is based on a quantity of physical pages addressable by an individual lower-level page to store data for an application, the resulting sets of data written to the memory system 110 from the buffer may have the preferred packet size. Further, by storing sets of data having the preferred packet size and being aligned to the preferred packet size in the memory system 110, the memory system 110 may use more efficient storage techniques to store the sets of data. For example, the memory system 110 may use higher-level page tables to directly point to physical resources (which may decrease a loading/unloading activity for page tables). Also, the memory system 110 may use an increased quantity of sequential access operations to store the sets of data (which may increase storage rates, decrease reduce fragmentation, etc.).

Figure 2:
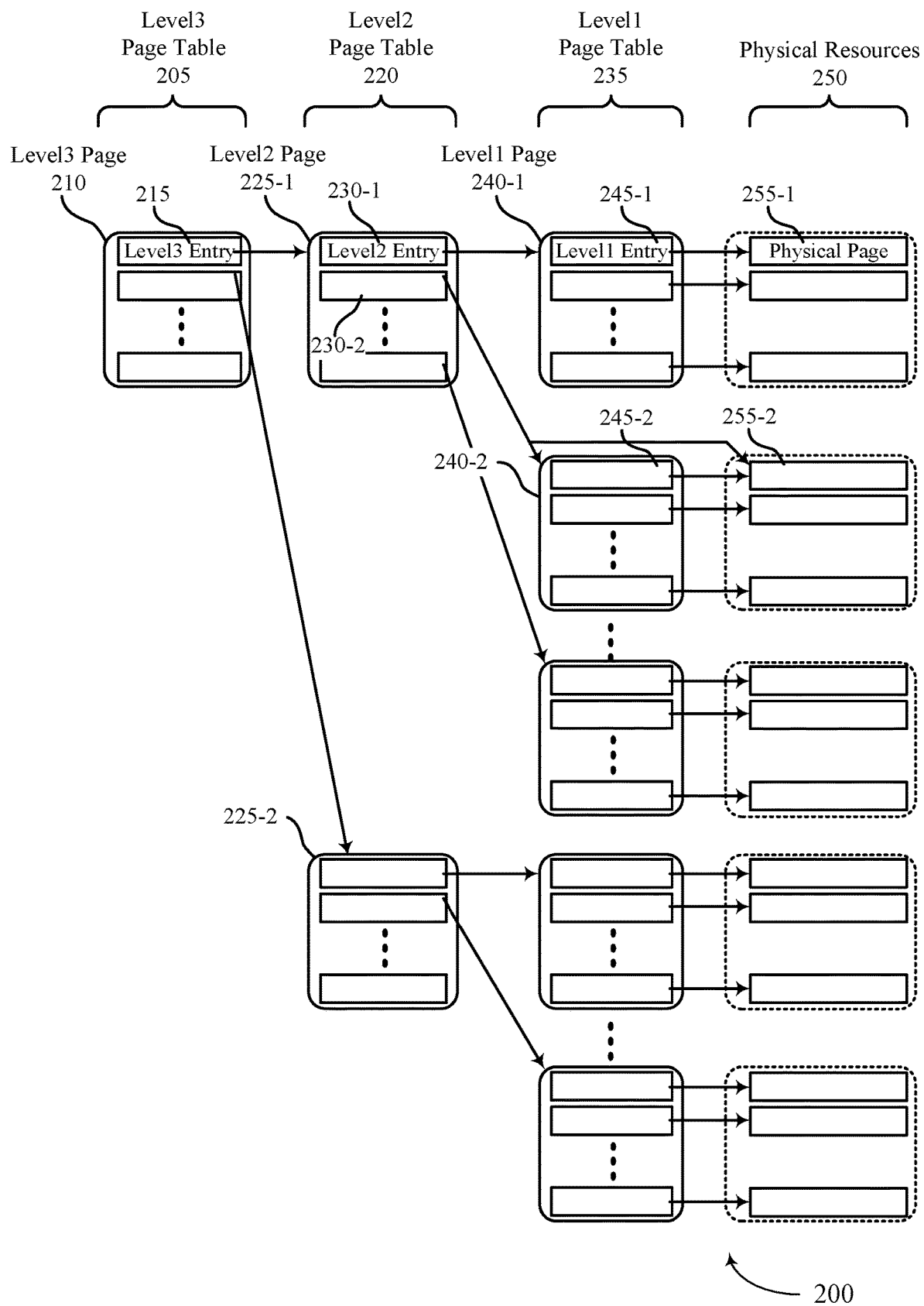
FIG. 2 illustrates an example of a system architecture that supports memory-aligned access operations in accordance with examples as disclosed herein.

FIG. 2 illustrates an example of a system architecture that supports memory-aligned access operations in accordance with examples as disclosed herein.

System architecture 200 depicts an architecture of an L2P table for memory system. An L2P table may include multiple tables of different hierarchical levels, including tables that map between higher-level pages of the L2P table and lower-level pages of the L2P table, and also including tables that map between logical page addresses and physical pages. Level1 page table 235 (which may be the lowest-level page table shown in FIG. 2) may map logical addresses directly to physical addresses of a memory device (which may more generally be referred to as physical resources 250). For example, a level1 entry 245 may correspond to a logical address of data stored at the memory device and may indicate a mapping from the logical address to a physical address of the memory device—e.g., first level1 entry 245-1 of first level1 page 240-1 may point to first physical page 255-1, where data associated with the logical address corresponding to level1 entry 245 may be stored. In some examples, a physical address of a memory device corresponds to a physical page 255 of the memory device (which may be an example of a page 175 as described with reference to FIG. 1). A level1 page 240 may be used to map to logical addresses for a quantity of physical pages 255 of a memory device—e.g., if a level1 page 240 includes 1024 entries, the level1 page 240 may be used to map 1024 logical addresses to 1024 physical pages 255 of the memory device. In some examples, each physical page 255 has a 4 KB size. Thus, a level1 page 240 that includes 1024 entries may point to a set of physical pages 255 having a 4 MB size (e.g., a set of physical pages 255 that can store 4 MB of data).

Level2 page table 220 (which may be a higher-level page table, at least relative to Level1 page table 235) may be used to identify a level1 page 240 based on a logical address. For example, a level2 entry 230 in level2 page table 220 may point to a level1 page 240 (e.g., may point to a physical address of a physical page 255 that stores the level1 page 240) that includes a received logical address—e.g., first level2 entry 230-1 of first level2 page 225-1 may point to first level1 entry 245-1 of first level1 page 240-1 (for example, may point to a physical address of a physical page 255 that stores first level1 page 240-1).

Level3 page table 205 (which may be the highest-level page table shown in FIG. 2) may be used to identify a level2 page 225 that includes a level2 entry 230 that points to a level1 page 240 that includes a received logical address—e.g., a level3 entry 215 in a level3 page 210 may point to a level2 page 225 (e.g., may point to a physical address of a physical page 255 that stores the level2 page 225) including a level2 entry 230 that points to a level1 page 240 including a received logical address. In some examples, any quantity of additional levels of page tables may be used—e.g., to support memory devices having increased capacity.

In some examples, at any given time during the memory system's operation, a portion of the page tables may be stored in volatile memory (e.g., SRAM, which may, for example, be included in local memory 120 as described with reference to FIG. 1). For example, level3 page table 205, a subset (or all) of level2 page table 220, and a subset of level1 page table 235 may be stored in the volatile memory. In some examples, a controller stores at any time only a portion of the page tables in the volatile memory due to capacity constraints of the volatile memory. Based on using multiple levels of page tables, a higher-level page table that is smaller in size may be used to identify the proper lower-level pages of the lower-level page tables for mapping a logical address to a physical address. If the identified lower-level pages (e.g., level 2 pages 225, level1 pages 240) are already stored in the volatile memory, those lower-level pages may be used by a controller to access the corresponding physical address. Otherwise, the controller may load the proper lower-level pages into the volatile memory (e.g., may read the proper lower-level pages from non-volatile memory and store them in the volatile memory) before using the proper lower-level pages to identify the corresponding physical address. That is, the page tables may be stored in non-volatile memory (e.g., of a memory device 130-a as described with reference to FIG. 1), and pages of the page tables may be loaded into volatile memory (e.g., local memory 120 as described with reference to FIG. 1) for use by the controller (e.g., memory system controller 115) on an as-needed basis.

Frequently loading lower-level pages into and out of the volatile memory based on reading the lower-level pages from the non-volatile memory and then writing the lower-level pages (e.g., updated versions thereof) back to the non-volatile memory may contribute to an accelerated decline of the operating life of a memory device (e.g. a memory device 130-a). Accordingly, to reduce such loading activity, compression techniques may be used. In such cases, each entry of a higher-level table (e.g., level2 page table 220) may include an indicator (e.g., a one bit indicator) of whether the data stored at a set of physical addresses mapped by a lower-level page (e.g., a level1 page 240) is storing sequential data. If the higher-level entry indicates that the set of physical addresses is storing sequential data, a controller may forego loading the lower-level page into SRAM (assuming the lower-level page is not already stored in SRAM) and read the physical pages at the set of physical addresses directly.

A memory system may be configured to take advantage of the efficiencies gained by performing sequential access operations (including the efficient storage of data, reduced access operations, reduced page table loading activity, page table compression capability, etc.) based on the system architecture, which may increase an operating life of the memory system. The memory system may be configured to indicate, to a host system, a size of data that may be stored by a set of physical pages 255 that corresponds to (e.g., is mapped to by) a single level1 page 240, where such a size of data may be a preferred packet size. In some examples, the memory system determines the size of the set of physical pages 255. In other examples, a parameter programmed at the memory system stored the size of the set of physical pages 255. In some examples, the preferred packet size is indicated for a particular type of applications at the host system—e.g., applications that process or generate a continuous stream of sequential (e.g., chronological) data (such as a recording application, black box application, media streaming application, etc.).

In some examples, the memory system indicates the size of the set of physical pages based on receiving an indication from a host system that an application of the particular type is activated at the host system. The memory system may also allocate sets of physical resources to the application. For example, the memory system may allocate sets of contiguous physical pages 255 corresponding to (e.g., mapped to by) individual level1 pages 240 (e.g., that may be contiguous or discontinuous). Each set of physical resources of the allocated sets of physical resources may have a size that is equivalent to the preferred packet size.

Based on receiving the indication, the host system may configure a buffer—e.g., a buffer at the host system, a buffer at the memory system, an external buffer, or any combination thereof (e.g., a buffer 137 as described with reference to FIG. 1). The host system may configure the buffer to have a size that is based on the preferred data packet size—e.g., greater than or equal to the preferred data packet size. In some examples, the host system may configure a second buffer having a same size as the buffer. In some examples, the one or more buffers are allocated to an application at the host system—e.g., an application that processes or generates a continuous stream of sequential data. The host system may store data for the application in the buffer. Based on reaching a threshold utilization of the buffer (e.g., based on filling the buffer), the host system may generate a data packet and command for writing the data packet to a memory system. The size of the data packet may be equal to the preferred packet size. Also, the command may include an indication of the size of the data packet and a logical address. The host system may transmit the data packet and command to the memory system. In some examples, the host system may issue write commands to the memory device based on generating a data packet with the preferred size and aligning the packet (e.g., a logical address thereof) to the preferred size. For example, the host system may assign the data packet a logical address such that the data packet will be stored at a set of physical pages 255 corresponding to a single level1 page 240, with the set of physical pages spanning from one physical page 255 corresponding to a first (e.g., initial, lowest) level1 entry 245 of the level1 page 240 to another physical page corresponding to a last (e.g., final, highest) level1 entry 245 of the same level1 page 240. For example, the host system may assign the data packet a logical address that is an integer multiple of the preferred size, or that is offset from an integer multiple of the preferred size by a predefined offset (e.g., an offset indicated to the host system by the memory system).

Based on receiving the data packet and the command, the memory system may execute operations for storing the data packet—e.g., in the physical resources allocated to the application. In some examples, the memory system may identify a level2 entry 230 based on the logical address included with the command. For example, if the logical address corresponds to an entry within second level1 page 240-2 (e.g., second level1 entry 245-2), the memory system may identify second level2 entry 230-2—based on determining that second level2 entry 230-2 points to a set of logical addresses including the logical address (e.g., second level2 entry 230-2 points to a physical address for a physical page 255 that stores the level1 page 240-2 of the level1 page table 235, where the logical address is one of the logical addresses mapped by the level1 page 240-2). Instead of performing operations associated with loading second level1 page 240-2 into volatile memory, the memory system may identify an initial physical address (e.g., second physical page 255-2) of a set of physical addresses associated with the second level1 page 240-2. Based on identifying the initial physical address, the memory system may write the data in the data packet to the set of physical pages associated with the set of physical addresses (e.g., all of the physical pages of the set of physical pages). In some examples, the memory system may write the data to a group of physical pages that is spread across multiple planes, device, or both—e.g., using a sequential write operation.

By writing the data directly to the full set of physical pages (e.g., without performing page table loading operations), a memory system may reduce a quantity of access operations performed at the memory device, decrease latency, increase storage efficiency, and increase its operating life. By generating data packets having the preferred size (equal to a size of a set of physical pages 255 addressed by a single level1 page 240) and aligning the packets to the preferred size (e.g., by assigning an initial logical address to the data packet that is equivalent to an initial logical address corresponding to a first level1 entry 245 of a level1 page 240), the host system may write the data directly to the full set of physical pages. Additionally, the data packet may match (e.g., be coincident with) the full set of physical pages 255 such that the data packet may be sequentially written to the full set of physical pages 255 and operations associated with filling the set of physical pages with placeholder (e.g., dummy) data may be avoided. Additionally, or alternatively, by generating data packets having the preferred size and aligning such packets to the preferred size, latencies, signaling overhead, or other drawbacks associated with retrieving multiple level1 pages 240 from long-term (e.g., non-volatile) storage (e.g., NAND storage) into short-term (e.g., volatile) storage (e.g., SRAM storage) at a memory controller may be avoided in connection with reading or writing a single data packet.

Figure 3:
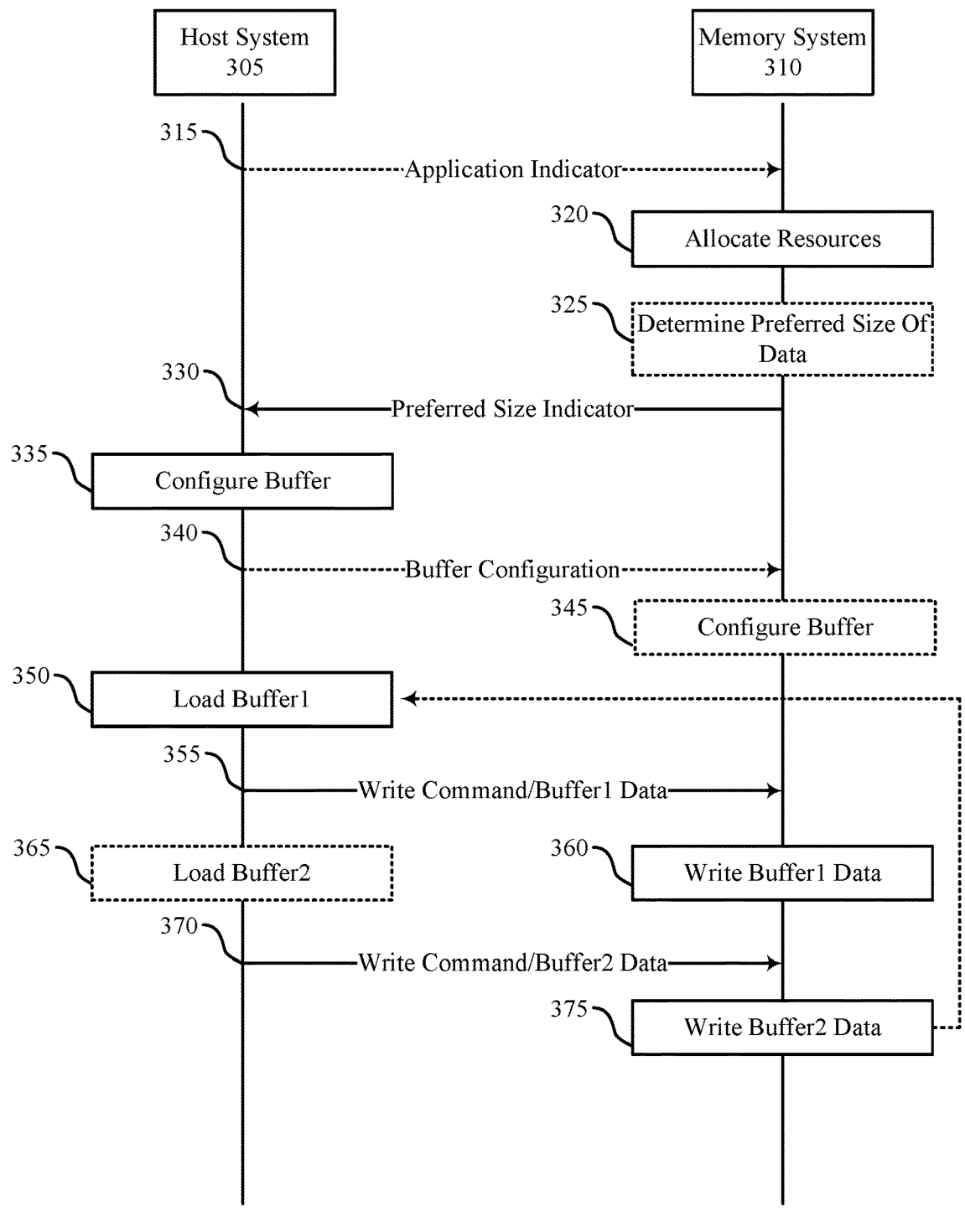
FIG. 3 illustrates an example of a set of operations for memory-aligned access operations in accordance with examples as disclosed herein.

FIG. 3 illustrates an example of a set of operations for memory-aligned access operations in accordance with examples as disclosed herein.

Process flow 300 may be performed by host system 305 and memory system 310, which may be respective examples of a host system and memory system described herein. In some examples, process flow 300 illustrates an example set of operations performed to support memory-aligned access operations. For example, process flow 300 may include operations for indicating a preferred data packet size as well as storing data for an application in a buffer and writing data stored in the buffer to memory system 310 in accordance with the preferred data packet size.

Aspects of the process flow 300 may be implemented by one or more controllers, among other components. Additionally, or alternatively, aspects of the process flow 300 may be implemented as instructions stored in memory (e.g., firmware stored in a memory coupled with a controller). For example, the instructions, when executed by the one or more controllers (e.g., at host system 305, memory system 310), may cause the controller to perform the operations of the process flow 300.

One or more of the operations described in process flow 300 may be performed earlier or later, omitted, replaced, supplemented, or combined with another operation. Also, additional operations described herein may replace, supplement or be combined with one or more of the operations described in process flow 300.

At 315, an indication of a type of one or more applications supported and/or initiated at host system 305 may be transmitted to memory system 310. In some examples, host system 305 indicates the types of applications supported by (e.g., installed on) host system 305. The types of application may include a type of application that processes or generates a continuous stream of sequential data, such as an application for recording audiovisual data (e.g., a black box application for an automobile).

At 320, resources may be allocated for an application at host system 305. In some examples, memory system 310 may allocate a set of physical resources (e.g., having a size of 4 GB) for an application at host system 305 that generates a continuous stream of sequential data.

At 325, a preferred size of data stored in the allocated resources may be determined. The preferred size of the data may be based on a quantity of lower-level entries in a lower-level page (e.g., 1024 entries) of a lower-level page table and a size of a physical page (e.g., 4 KB). In some examples, memory system 310 may determine a preferred size of data (which may be referred to as a preferred packet size) to be stored in the resources allocated to the application—e.g., based on the type of the application. Memory system 310 may determine the preferred size based on stored parameters related to the structure of lower-level page tables and physical pages, on determining the quantity of lower-level entries in a lower-level page and a size of a physical page and computing the preferred packet size, or a combination thereof. In some examples, memory system 310 determines a set of preferred packet sizes for a set of application types.

At 330, one or more preferred packet sizes for storing data in memory system 310 for one or more types of application may be received at host system 305. In some examples, memory system 310 indicates a preferred packet size for applications that process or generate continuous streams of sequential data. Memory system 310 may also indicate preferred packet sizes for other types of application. In some examples, memory system 310 indicates a preferred packet size for an application type based on receiving an indication from host system 305 that an application of the type has been initiated at host system 305. In some examples, memory system 310 may indicate the preferred packet sizes for a set (e.g., all) of the application types—e.g., based on establishing a connection with host system 305. In some examples, memory system 310 transmits a message including an indication of a preferred packet size and an indication of an application for which the preferred packet size applies. In some examples, memory system 310 transmits a message including an indication of multiple preferred packet size for multiple corresponding applications.

At 335, a buffer may be configured based on the preferred packet size indicated by memory system 310. In some examples, host system 305 may configure the buffer (which may be referred to as buffer1) to store data associated with an application of a type that is associated with the preferred packet size. The buffer may be located within host system 305, within memory system 310, or external to host system 305 and memory system 310. The buffer may include volatile cells, such as DRAM cells. Host system 305 may configure the buffer to have a size that is greater than or equal to the preferred packet size. Host system 305 may also configure a second buffer that has a size that is greater than or equal to the preferred packet size. In some examples, host system 305 configures multiple buffers or sets of buffers for different application types supported by host system 305.

At 340, an indication of the buffer configuration may be sent to memory system 310. In some examples, as part of configuring the buffer, host system 305 may send signaling to memory system 310 that causes memory system 310 to configure one or more buffers.

At 345, one or more buffers may be configured at memory system 310—e.g., based on the buffer configuration message received from host system 305. In some examples, memory system 310 creates the one or more buffers using volatile memory cells within memory system 310. In some examples, memory system 310 configures multiple buffers or sets of buffers for different application types. In some examples, memory system 310 configures the one or more buffers based on sending the preferred size indicator to host system 305.

At 350, a buffer (which may be referred to as buffer1) of the one or more configured buffers may be loaded. In some examples, host system 305 loads the buffer based on storing, in the buffer, data generated by an application associated with the buffer. In some examples to store the data in the buffer, host system 305 may transmit the data to memory system 310, where memory system 310 may store the data in a buffer configured at memory system 310.

At 355, a command for writing data stored in the buffer to memory system 310 may be transmitted to memory system 310. In some examples, the data stored in the buffer may also be transmitted to memory system 310—e.g., if the buffer is located external to memory system 310. Host system 305 may transmit a command for transferring the data stored in the buffer to a memory device of memory system 310 based on a utilization of the buffer reaching a threshold—e.g., based on filling the buffer.

At 360, the data (which may also be referred to as the contents) stored in the buffer may be written to memory system 310. In some examples, the data stored in the buffer is written to a memory device at memory system 310. In some examples, memory system 310 receives the data from an external source (e.g., an external buffer) before writing the data to the memory device. In some examples, memory system 310 transfers the data from an internal buffer to the memory device.

At 365, a second buffer may be loaded with data for the application—e.g., while the data stored in the first buffer is written to a memory device at memory system 310. For example, host system 305 may write data processed or generated by an application to the second buffer while the data stored in the first buffer is written to the memory device.

At 370 and 375, the data stored in the second buffer may be written to memory system 310, as similarly described with reference to 360 and 365. Concurrently with writing the data to memory system 310 from the second buffer, host system may load the first buffer with data for the application, as similarly described with reference to 350.

Figure 4:
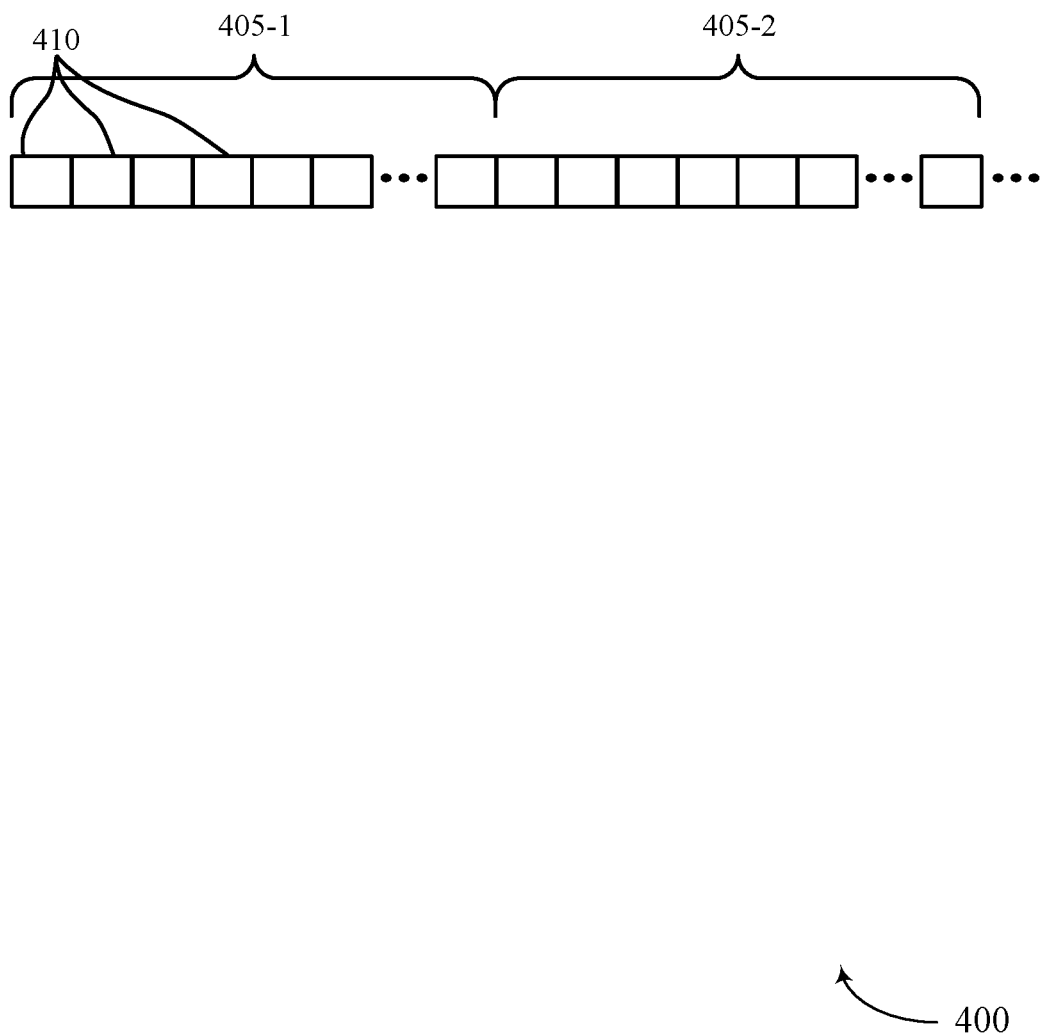
FIG. 4 illustrates an example of a resource diagram that supports memory-aligned access operations in accordance with examples as disclosed herein.

FIG. 4 illustrates an example of a resource diagram that supports memory-aligned access operations in accordance with examples as disclosed herein. Resource diagram 400 depicts logical addresses organized into sets of logical addresses based on a preferred packet format of a write command intended to be transmitted to a memory system. First set of logical addresses 405-1 may include logical addresses 410. A size of data addressable by the sets of logical addresses 410 may be equivalent to a preferred packet size indicated by a memory system, a size of a buffer configured at the host system based on the preferred packet size, or both. The first logical address 410 of each set of logical addresses 405 may be aligned with (e.g., correspond to an integer multiple of) the preferred packet size, such that, with additional reference to FIG. 2, the first logical address 410 of a set of logical addresses 405 may correspond to a first level1 entry 245 of a level1 page 240, and the last logical address 410 of a set of logical addresses 405 may correspond to a last level1 entry 245 of the same level1 page 240, with the data packet stored at physical pages 255 all mapped by the same level1 page 240 (e.g., stored at all such physical pages, with no other physical pages 255 not mapped by the same level1 page 240 used to store the data packet).

For example, if the preferred packet size is N MB (e.g., 4 MB) and a logical address addresses MKB (e.g., 4 KB), the first logical address 410 of first set of logical addresses 405-1 may be equivalent to the logical address obtained by computing $N/M*(k-1)$, where k may be equal to index of the current set of logical addresses 405 (e.g., an index of the first set of logical addresses 405-1 may be equal to 1) In some examples, the first logical address of the first set of logical addresses 405-1 may be equal to logical address 0. The first logical address 410 of second set of logical addresses 405-2 may be equivalent to logical address 1024. The first logical address 410 of a third set of logical addresses may be equivalent to logical address 2048, And so on.

In some examples, each logical address 410 may address 4 KB of physical resources and a set of logical addresses 410 may address 4 MB of data. For example, logical addresses 0 through 1023 may address 4 MB of data. The logical addresses 410 of a set of logical addresses 405 may correspond to (e.g., be aligned with) a page of a lower-level page table (e.g., a level1 page of FIG. 2), a set of physical addresses of a memory system (e.g., the set of physical pages 255 addressed by a level1 page), or both. For example, with further reference to FIG. 2, first set of logical addresses 405-1 may correspond to the logical addresses included in the first level1 page 240-1 and the set of physical pages 255 addressed by the first level1 page 240-1 (e.g., beginning with first physical page 255-1). And further, second set of logical addresses 405-2 may correspond to the logical addresses included in the second level1 page 240-2 and the set of physical pages 255 addressed by the second level1 page 240-2 (e.g., beginning with second physical page 255-2).

A host system may store sets of data generated for an application (e.g., an application that generates a continuous stream of sequential data) and assign logical addresses 410 to these sets of data in accordance with the sets of logical addresses 405. For example, the host system may assign a first set of logical addresses 405-1 for write commands associated with a first data packet and a second set of logical addresses 405-2 for write commands associated with a second data packet. The host system may write the first data packet to first set of logical addresses 405-1 based on filling the buffer with the first data packet, the second data packet to the second set of logical addresses 405-2 based on filling the buffer (or a second buffer) with the second data packet, and so on. The memory system may write the data in the first data packet directly to a first set of physical pages at a first set of physical addresses corresponding to the first set of logical addresses 405-1, the data in the second data packet directly to a second set of physical pages at a second set of physical addresses corresponding to the second set of logical addresses 405-2, and so on. In some examples, the first set of physical pages may correspond to a set of physical pages addressed by a first lower-level page (e.g., first level1 page 240-1 of FIG. 2) of a lower-level page table (e.g., level1 page table 235 of FIG. 2) and a first higher-level entry (e.g., first level2 entry 230-1 of FIG. 2) of a higher-level page table (e.g., level2 page table 220 of FIG. 2), while the second set of physical pages may correspond to a set of physical pages addressed by a second lower-level page (e.g., second level1 page 240-2 of FIG. 2) of the lower-level page table (e.g., level1 page table 235 of FIG. 2) and a second higher-level entry (e.g., second level2 entry 230-2 of FIG. 2) of the higher-level page table (e.g., level2 page table 220 of FIG. 2).

In such cases, a host system may generate data packets having a preferred size indicated by the memory system having logical addresses that are aligned to the preferred size. Based on the data packets having the preferred size and the logical address being aligned to the preferred size, the memory system may write the data packets directly to full sets of physical pages that correspond to full lower-level pages and individual entries of a higher-level page—e.g., with minimal or otherwise reduced loading/unloading of lower-level pages from/to memory and without placeholder data being generated to support a write operation that writes data to full sets of physical pages.

Figure 5:
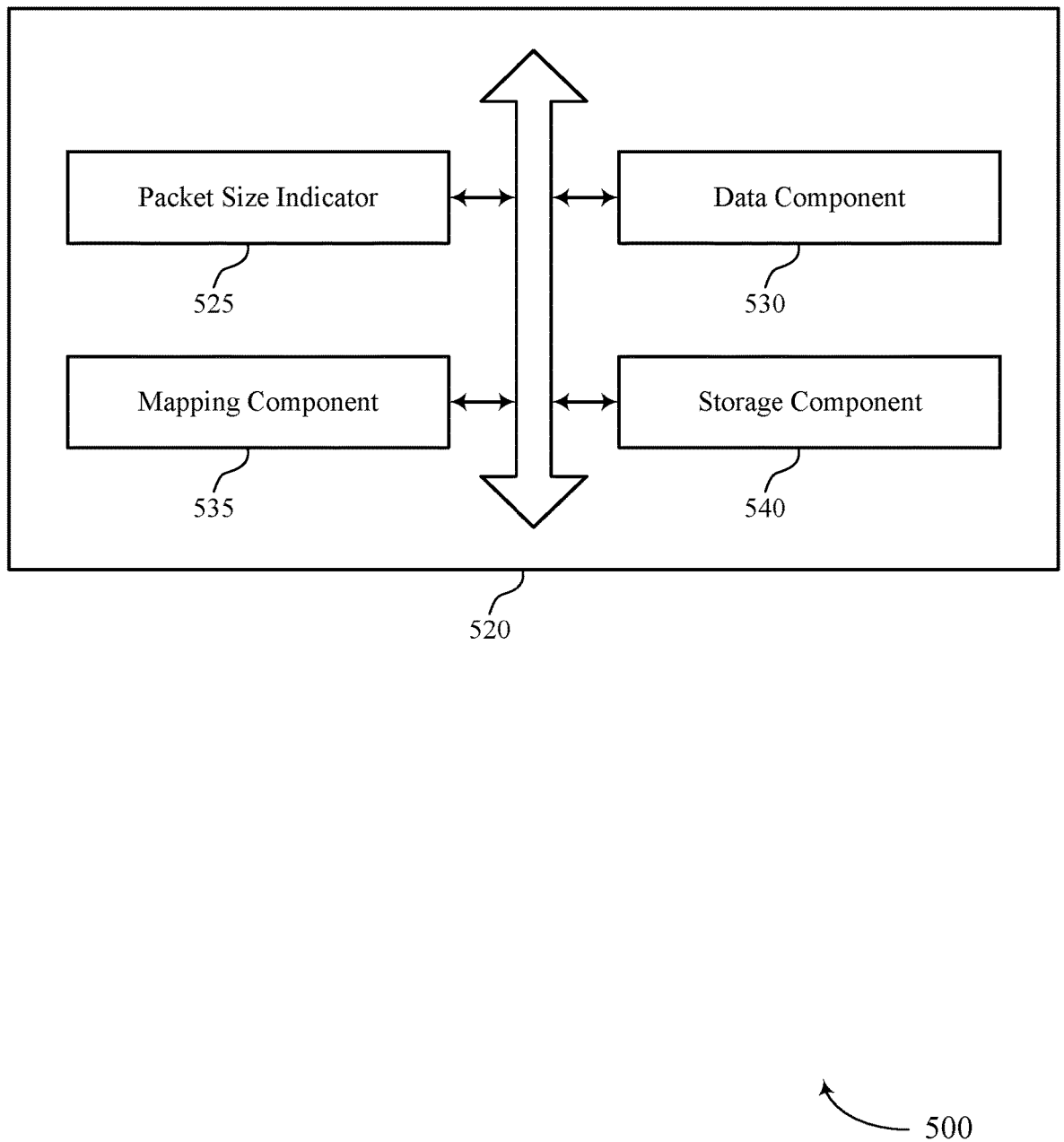
FIG. 5 shows a block diagram of a memory system that supports memory-aligned access operations in accordance with examples as disclosed herein.

FIG. 5 shows a block diagram 500 of a memory system 520 that supports memory-aligned access operations in accordance with examples as disclosed herein. The memory system 520 may be an example of aspects of a memory system as described with reference to FIGS. 1 through 4. The memory system 520, or various components thereof, may be an example of means for performing various aspects of memory-aligned access operations as described herein. For example, the memory system 520 may include a packet size indicator 525, a data component 530, a mapping component 535, a storage component 540, or any combination thereof. Each of these components may communicate, directly or indirectly, with one another (e.g., via one or more buses).

The packet size indicator 525 may be configured as or otherwise support a means for transmitting, to a host system, an indication of a data size corresponding to a quantity of physical pages that is addressable by individual first-level pages of a first-level page table for mapping logical addresses to respective physical pages of a plurality of physical pages, where the data size is associated with a target packet size for an application at the host system. The data component 530 may be configured as or otherwise support a means for receiving, from the host system based at least in part on transmitting the indication, a set of data associated with the application and a command to write the set of data to a memory device, a size of the set of data being the target packet size and the command including a logical address for the set of data. The mapping component 535 may be configured as or otherwise support a means for identifying, based at least in part on the logical address, a second-level entry of a second-level page table, where the second-level entry of the second-level page table points to a first-level page of the first-level page table, and where first-level entries of the first-level page map a set of logical addresses to a set of physical addresses, the set of logical addresses including the logical address. The storage component 540 may be configured as or otherwise support a means for writing, based at least in part on identifying the second-level entry, the set of data to the set of physical addresses.

In some examples, the packet size indicator 525 may be configured as or otherwise support a means for transmitting a second indication of an application type associated with the target packet size, the application being of the application type.

In some examples, the storage component 540 may be configured as or otherwise support a means for allocating, to the application and from among the plurality of physical pages, sets of physical pages for storing a stream of sequential data generated by the application.

In some examples, the storage component 540 may be configured as or otherwise support a means for receiving, from the host system, an indication that the application is running at the host system, where the sets of physical pages are allocated to the application and the indication of the data size is transmitted based at least in part on receiving the indication that the application is running at the host system.

In some examples, each of the sets of physical pages correspond to a respective first-level page of the first-level page table and a respective second-level entry of the second-level page table, and the mapping component 535 may be configured as or otherwise support a means for storing an indication that the sets of physical pages are addressable via the respective second-level entries.

In some examples, the mapping component 535 may be configured as or otherwise support a means for refraining from loading, into volatile memory cells, the first-level page in response to receiving the command based at least in part on the indication that the sets of physical pages are addressable via the respective second-level entries.

In some examples, the sets of physical pages have respective physical addresses that are sequential, and each of the sets of physical pages includes a respective initial page that corresponds to an initial first-level entry of a respective first-level page.

In some examples, the mapping component 535 may be configured as or otherwise support a means for determining whether a second-level page of the second-level page table that includes the second-level entry is stored in volatile memory cells, where the second-level entry of the second-level page table is identified based at least in part on determining that the second-level page is stored in the volatile memory cells.

In some examples, the mapping component 535 may be configured as or otherwise support a means for determining a mapping between the second-level entry and the set of physical addresses, where the set of data is written to the set of physical addresses based at least in part on the mapping.

In some examples, the packet size indicator 525 may be configured as or otherwise support a means for determining the data size based at least in part on a quantity of first-level entries included in the individual first-level pages of the first-level page table and further based at least in part on a size of a physical page of the plurality of physical pages, where the indication is based at least in part on determining the size.

In some examples, the command includes an indication of the size of the set of data. In some examples, the application generates a stream of sequential data.

Figure 6:
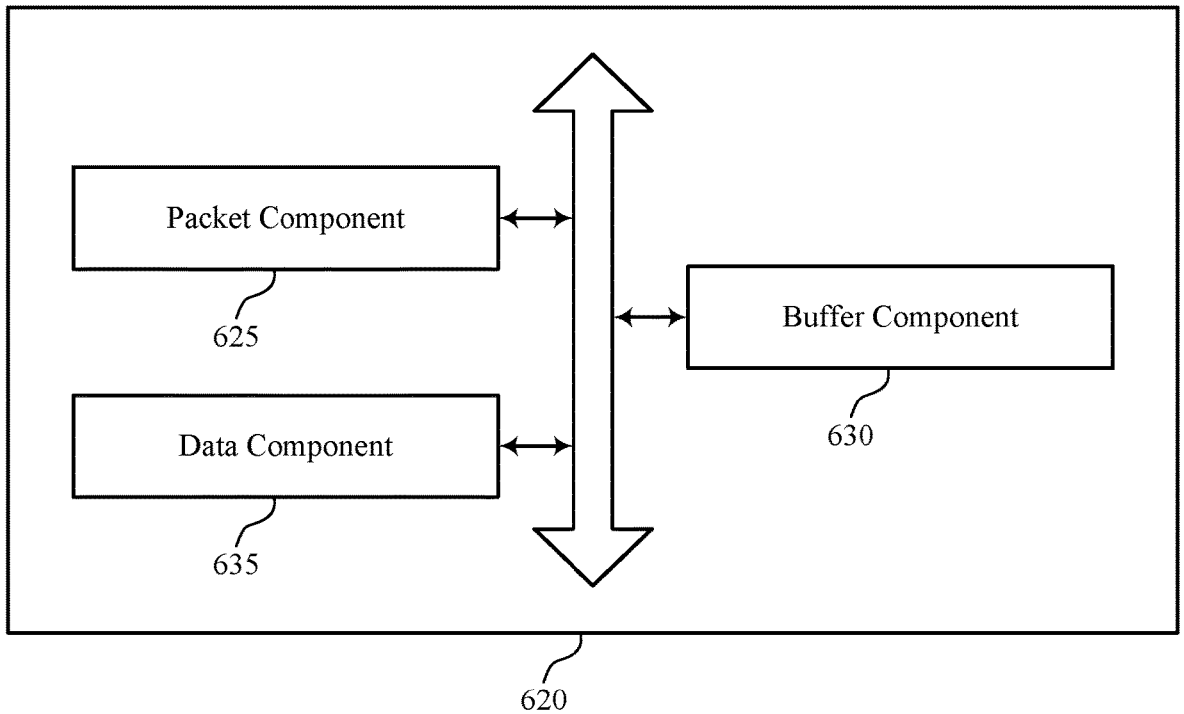
FIG. 6 shows a block diagram of a host system that supports memory-aligned access operations in accordance with examples as disclosed herein.

FIG. 6 shows a block diagram 600 of a host system 620 that supports memory-aligned access operations in accordance with examples as disclosed herein. The host system 620 may be an example of aspects of a host system as described with reference to FIGS. 1 through 4. The host system 620, or various components thereof, may be an example of means for performing various aspects of memory-aligned access operations as described herein. For example, the host system 620 may include a packet component 625, a buffer component 630, a data component 635, or any combination thereof. Each of these components may communicate, directly or indirectly, with one another (e.g., via one or more buses).

The packet component 625 may be configured as or otherwise support a means for receiving, from a memory system, an indication of a data size corresponding to a quantity of physical pages that is addressable by a first-level page of a first-level page table for mapping logical addresses to respective physical pages of memory cells at the memory system, where the data size is associated with a target packet size for an application. The buffer component 630 may be configured as or otherwise support a means for configuring, based at least in part on the indication, a buffer to have a size that is greater than or equal to the target packet size. The data component 635 may be configured as or otherwise support a means for storing, in the buffer, data for the application based at least in part on configuring the buffer. In some examples, the data component 635 may be configured as or otherwise support a means for sending, to the memory system based at least in part on a size of the data stored in the buffer reaching a threshold, a set of data stored in the buffer and a command to write the set of data, where a size of the set of data is the target packet size. In some examples, the logical address assigned to the data packet may be aligned to the preferred packet size (e.g., may be an integer multiple of the target packet size).

In some examples, the data component 635 may be configured as or otherwise support a means for storing, in a second buffer, the data for the application based at least in part on sending the set of data to the memory system.

In some examples, the command includes a logical address that corresponds to an entry of the first-level page.

In some examples, the application is configured to reach a utilization threshold of the buffer within a duration.

Figure 7:
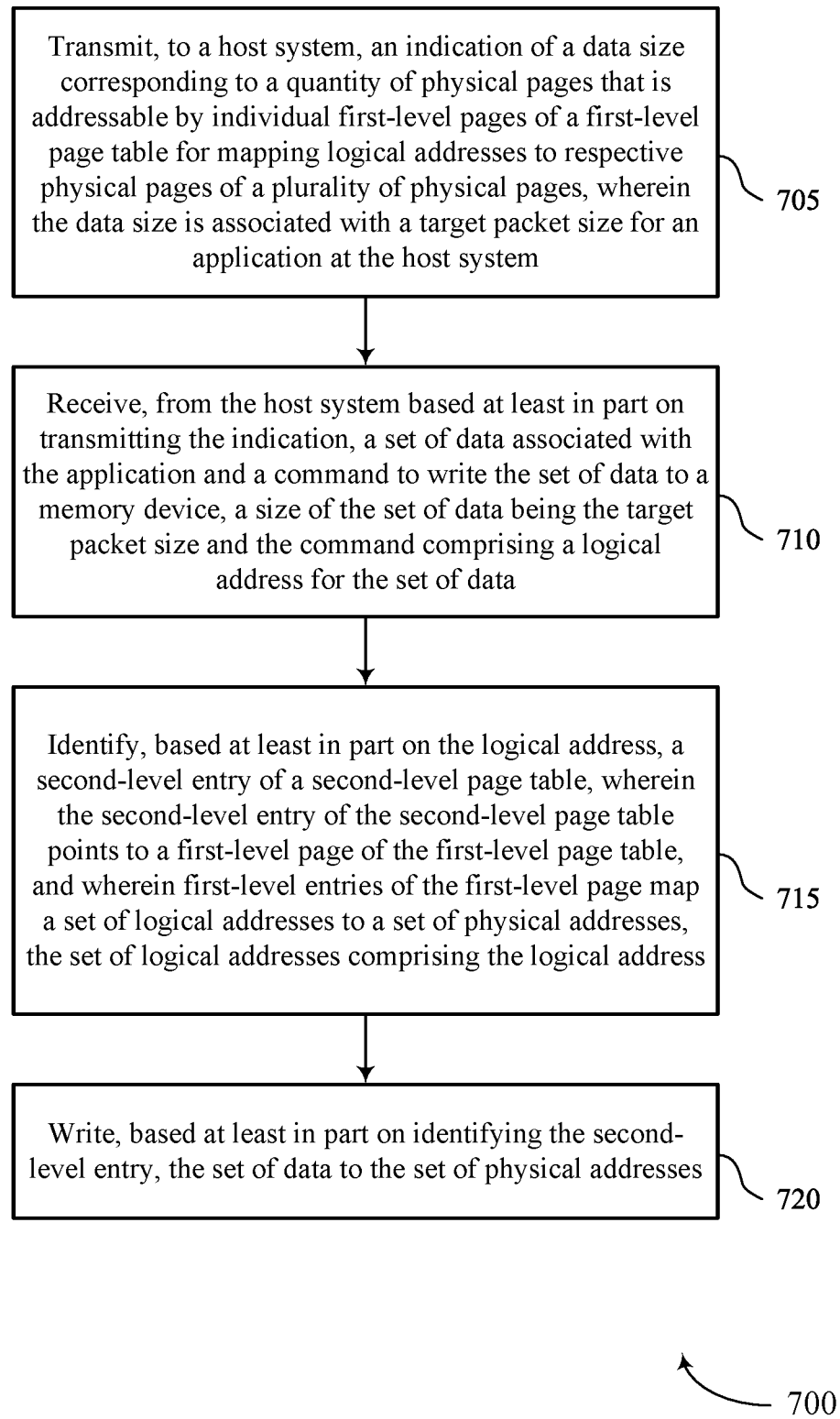
FIGS. 7 and 8 show flowcharts illustrating a method or methods that support memory-aligned access operations in accordance with examples as disclosed herein.

FIG. 7 shows a flowchart illustrating a method 700 that supports memory-aligned access operations in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include transmitting, to a host system, an indication of a data size corresponding to a quantity of physical pages that is addressable by individual first-level pages of a first-level page table for mapping logical addresses to respective physical pages of a plurality of physical pages, where the data size is associated with a target packet size for an application at the host system. The operations of 705 may be performed in accordance with examples as disclosed herein. In some examples, aspects of the operations of 705 may be performed by a packet size indicator 525 as described with reference to FIG. 5.

At 710, the method may include receiving, from the host system based at least in part on transmitting the indication, a set of data associated with the application and a command to write the set of data to a memory device, a size of the set of data being the target packet size and the command including a logical address for the set of data. The operations of 710 may be performed in accordance with examples as disclosed herein. In some examples, aspects of the operations of 710 may be performed by a data component 530 as described with reference to FIG. 5.

At 715, the method may include identifying, based at least in part on the logical address, a second-level entry of a second-level page table, where the second-level entry of the second-level page table points to a first-level page of the first-level page table, and where first-level entries of the first-level page map a set of logical addresses to a set of physical addresses, the set of logical addresses including the logical address. The operations of 715 may be performed in accordance with examples as disclosed herein. In some examples, aspects of the operations of 715 may be performed by a mapping component 535 as described with reference to FIG. 5.

At 720, the method may include writing, based at least in part on identifying the second-level entry, the set of data to the set of physical addresses. The operations of 720 may be performed in accordance with examples as disclosed herein. In some examples, aspects of the operations of 720 may be performed by a storage component 540 as described with reference to FIG. 5.

In some examples, an apparatus as described herein may perform a method or methods, such as the method 700. The apparatus (e.g., an electronic device) may include, features, circuitry, logic, means, or instructions (e.g., a non-transitory, computer-readable medium storing instructions executable by a processor), or any combination thereof for performing the following aspects of the present disclosure:

Aspect 1: A method or apparatus, including operations, features, circuitry, logic, means, or instructions, or any combination thereof for transmitting, to a host system, an indication of a data size corresponding to a quantity of physical pages that is addressable by individual first-level pages of a first-level page table for mapping logical addresses to respective physical pages of a plurality of physical pages, where the data size is associated with a target packet size for an application at the host system; receiving, from the host system based at least in part on transmitting the indication, a set of data associated with the application and a command to write the set of data to a memory device, a size of the set of data being the target packet size and the command including a logical address for the set of data; identifying, based at least in part on the logical address, a second-level entry of a second-level page table, where the second-level entry of the second-level page table points to a first-level page of the first-level page table, and where first-level entries of the first-level page map a set of logical addresses to a set of physical addresses, the set of logical addresses including the logical address; and writing, based at least in part on identifying the second-level entry, the set of data to the set of physical addresses.

Aspect 2: The method or apparatus of aspect 1, wherein the logical address for the set of data is aligned to an integer multiple of the target packet size.

Aspect 3: The method or apparatus of aspect 1, further including operations, features, circuitry, logic, means, or instructions, or any combination thereof for transmitting a second indication of an application type associated with the target packet size, the application being of the application type.

Aspect 4: The method or apparatus of any of aspects 1 through 3, further including operations, features, circuitry, logic, means, or instructions, or any combination thereof for allocating, to the application and from among the plurality of physical pages, sets of physical pages for storing a stream of sequential data generated by the application.

Aspect 5: The method or apparatus of aspect 4, further including operations, features, circuitry, logic, means, or instructions, or any combination thereof for receiving, from the host system, an indication that the application is running at the host system, where the sets of physical pages are allocated to the application and the indication of the data size is transmitted based at least in part on receiving the indication that the application is running at the host system.

Aspect 6: The method or apparatus of any of aspects 4 through 5 where each of the sets of physical pages correspond to a respective first-level page of the first-level page table and a respective second-level entry of the second-level page table and the method, apparatuses, and non-transitory, computer-readable medium, further includes operations, features, circuitry, logic, means, or instructions, or any combination thereof for storing an indication that the sets of physical pages are addressable via the respective second-level entries.

Aspect 7: The method or apparatus of aspect 6, further including operations, features, circuitry, logic, means, or instructions, or any combination thereof for refraining from loading, into volatile memory cells, the first-level page in response to receiving the command based at least in part on the indication that the sets of physical pages are addressable via the respective second-level entries.

Aspect 8: The method or apparatus of any of aspects 4 through 7, further including operations, features, circuitry, logic, means, or instructions, or any combination thereof for the sets of physical pages have respective physical addresses that are sequential, and each of the sets of physical pages includes a respective initial page that corresponds to an initial first-level entry of a respective first-level page.

Aspect 9: The method or apparatus of any of aspects 1 through 8, further including operations, features, circuitry, logic, means, or instructions, or any combination thereof for determining whether a second-level page of the second-level page table that includes the second-level entry is stored in volatile memory cells, where the second-level entry of the second-level page table is identified based at least in part on determining that the second-level page is stored in the volatile memory cells.

Aspect 10: The method or apparatus of any of aspects 1 through 9, further including operations, features, circuitry, logic, means, or instructions, or any combination thereof for determining a mapping between the second-level entry and the set of physical addresses, where the set of data is written to the set of physical addresses based at least in part on the mapping.

Aspect 11: The method or apparatus of any of aspects 1 through 10, further including operations, features, circuitry, logic, means, or instructions, or any combination thereof for determining the data size based at least in part on a quantity of first-level entries included in the individual first-level pages of the first-level page table and further based at least in part on a size of a physical page of the plurality of physical pages, where the indication is based at least in part on determining the size.

Aspect 12: The method or apparatus of any of aspects 1 through 11, further including operations, features, circuitry, logic, means, or instructions, or any combination thereof for the command includes an indication of the size of the set of data.

Aspect 13: The method or apparatus of any of aspects 1 through 12, further including operations, features, circuitry, logic, means, or instructions, or any combination thereof for the application generates a stream of sequential data.

Figure 8:
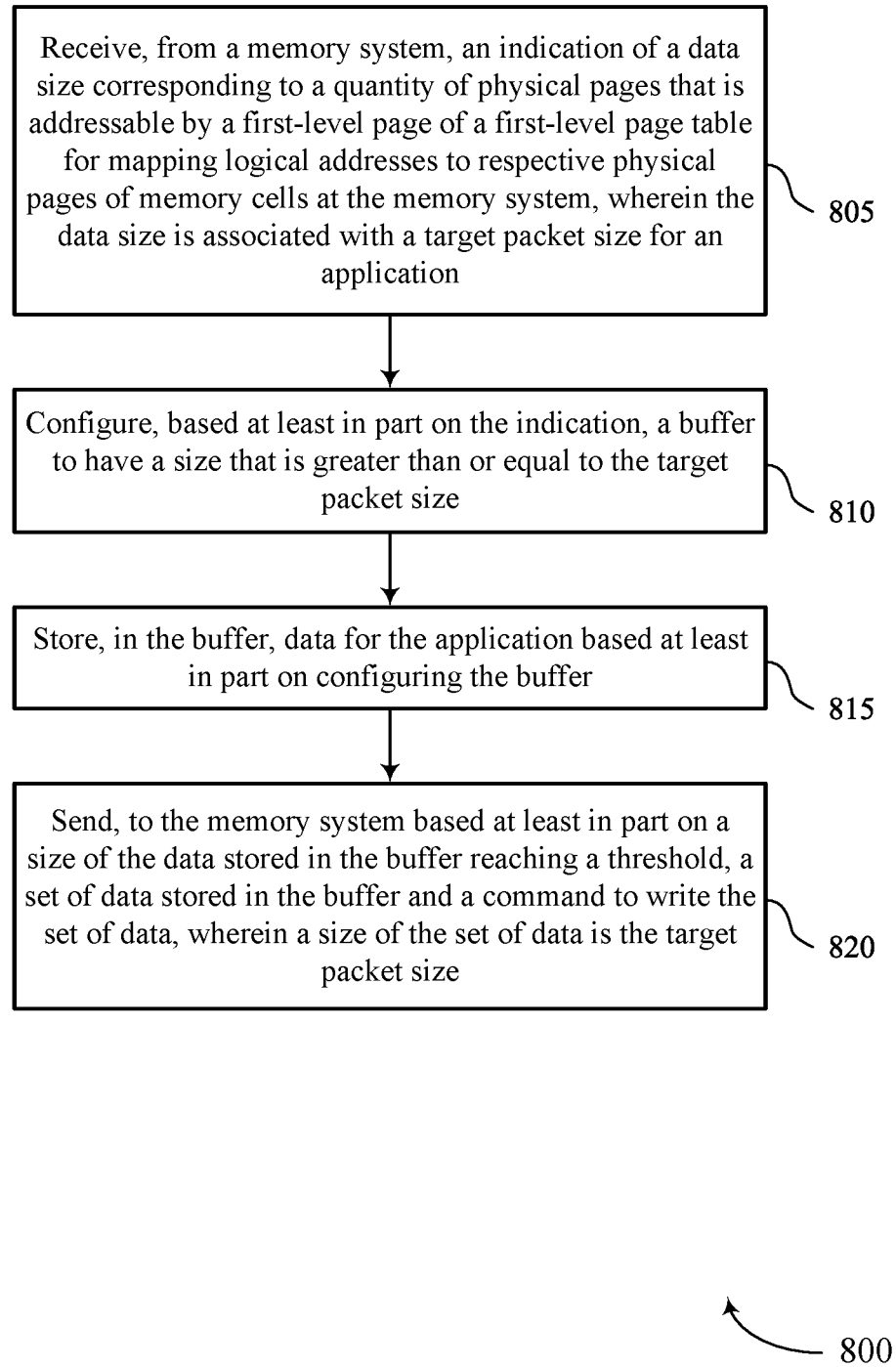

FIG. 8 shows a flowchart illustrating a method 800 that supports memory-aligned access operations in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally, or alternatively, the host system may perform aspects of the described functions using special-purpose hardware.

At 805, the method may include receiving, from a memory system, an indication of a data size corresponding to a quantity of physical pages that is addressable by a first-level page of a first-level page table for mapping logical addresses to respective physical pages of memory cells at the memory system, where the data size is associated with a target packet size for an application. The operations of 805 may be performed in accordance with examples as disclosed herein. In some examples, aspects of the operations of 805 may be performed by a packet component 625 as described with reference to FIG. 6.

At 810, the method may include configuring, based at least in part on the indication, a buffer to have a size that is greater than or equal to the target packet size. The operations of 810 may be performed in accordance with examples as disclosed herein. In some examples, aspects of the operations of 810 may be performed by a buffer component 630 as described with reference to FIG. 6.

At 815, the method may include storing, in the buffer, data for the application based at least in part on configuring the buffer. The operations of 815 may be performed in accordance with examples as disclosed herein. In some examples, aspects of the operations of 815 may be performed by a data component 635 as described with reference to FIG. 6.

At 820, the method may include sending, to the memory system based at least in part on a size of the data stored in the buffer reaching a threshold, a set of data stored in the buffer and a command to write the set of data, where a size of the set of data is the target packet size. The operations of 820 may be performed in accordance with examples as disclosed herein. In some examples, aspects of the operations of 820 may be performed by a data component 635 as described with reference to FIG. 6.

In some examples, an apparatus as described herein may perform a method or methods, such as the method 800. The apparatus may include, features, circuitry, logic, means, or instructions (e.g., a non-transitory, computer-readable medium storing instructions executable by a processor), or any combination thereof for performing the following aspects of the present disclosure:

Aspect 14: A method or apparatus, including operations, features, circuitry, logic, means, or instructions, or any combination thereof for receiving, from a memory system, an indication of a data size corresponding to a quantity of physical pages that is addressable by a first-level page of a first-level page table for mapping logical addresses to respective physical pages of memory cells at the memory system, where the data size is associated with a target packet size for an application; configuring, based at least in part on the indication, a buffer to have a size that is greater than or equal to the target packet size; storing, in the buffer, data for the application based at least in part on configuring the buffer; and sending, to the memory system based at least in part on a size of the data stored in the buffer reaching a threshold, a set of data stored in the buffer and a command to write the set of data, where a size of the set of data is the target packet size.

Aspect 15: The method or apparatus of aspect 14, wherein the command comprises a logical address for the set of data that is aligned to an integer multiple of the target packet size.

Aspect 16: The method or apparatus of aspect 14, further including operations, features, circuitry, logic, means, or instructions, or any combination thereof for storing, in a second buffer, the data for the application based at least in part on sending the set of data to the memory system.

Aspect 17: The method or apparatus of any of aspects 14 through 16, further including operations, features, circuitry, logic, means, or instructions, or any combination thereof for the command includes a logical address that corresponds to an entry of the first-level page.

Aspect 18: The method or apparatus of any of aspects 14 through 17, further including operations, features, circuitry, logic, means, or instructions, or any combination thereof for the application is configured to reach a utilization threshold of the buffer within a duration.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory, computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device comprising a plurality of physical pages of non-volatile memory cells; and
a controller coupled with the memory device and configured to cause the apparatus to:
transmit, to a host system, an indication of a data size corresponding to a quantity of physical pages that are addressable by individual first-level pages of a first-level page table for mapping logical addresses to respective physical pages of the plurality of physical pages, wherein a target packet size for an application at the host system is based at least in part on the data size;
receive, from the host system based at least in part on transmitting the indication, a set of data associated with the application and a command to write the set of data to the memory device, a size of the set of data being the target packet size and the command comprising a logical address for the set of data;
identify, based at least in part on the logical address, a second-level entry of a second-level page table, wherein the second-level entry of the second-level page table points to a first-level page of the first-level page table, and wherein first-level entries of the first-level page map a set of logical addresses to a set of physical addresses, the set of logical addresses comprising the logical address; and
write, based at least in part on identifying the second-level entry, the set of data to the set of physical addresses beginning at a first physical address corresponding to a lowest logical address mapped to by a lowest level page of the first-level page table and ending at a second physical address corresponding to a highest logical address mapped to by the lowest level page of the first-level page table.

2. The apparatus of claim 1, wherein the logical address for the set of data is aligned to an integer multiple of the target packet size.

3. The apparatus of claim 1, wherein the controller is further configured to cause the apparatus to:
transmit, to the host system, a second indication of an application type for which the target packet size applies, the application being of the application type.

4. The apparatus of claim 1, wherein the controller is further configured to cause the apparatus to:
allocate, to the application and from among the plurality of physical pages, sets of physical pages for storing a stream of sequential data generated by the application.

5. The apparatus of claim 4, wherein the controller is further configured to cause the apparatus to:
receive, from the host system, an indication that the application is running at the host system, wherein the sets of physical pages are allocated to the application and the indication of the data size is transmitted based at least in part on receiving the indication that the application is running at the host system.

6. The apparatus of claim 4, wherein each of the sets of physical pages correspond to a respective first-level page of the first-level page table and a respective second-level entry of the second-level page table, the controller further configured to cause the apparatus to:
store an indication that the sets of physical pages are addressable via the respective second-level entry.

7. The apparatus of claim 6, further comprising:
volatile memory cells, wherein the controller is further configured to cause the apparatus to:
refrain from loading, into the volatile memory cells, the first-level page in response to receiving the command based at least in part on the indication that the sets of physical pages are addressable via the respective second-level entry.

8. The apparatus of claim 4, wherein:
the sets of physical pages have respective physical addresses that are sequential, and each of the sets of physical pages comprises a respective initial page that corresponds to an initial first-level entry of a respective first-level page.

9. The apparatus of claim 1, further comprising:
volatile memory cells, wherein the controller is further configured to cause the apparatus to:
determine whether a second-level page of the second-level page table that comprises the second-level entry is stored in the volatile memory cells, wherein the second-level entry of the second-level page table is identified based at least in part on determining that the second-level page is stored in the volatile memory cells.

10. The apparatus of claim 1, wherein the controller is further configured to cause the apparatus to:
determine a mapping between the second-level entry and the set of physical addresses, wherein the set of data is written to the set of physical addresses based at least in part on the mapping.

11. The apparatus of claim 1, wherein the controller is further configured to cause the apparatus to:
determine the data size based at least in part on a quantity of first-level entries included in the individual first-level pages of the first-level page table and further based at least in part on a size of a physical page of the plurality of physical pages, wherein the indication is based at least in part on determining the data size.

12. The apparatus of claim 1, wherein the command comprises an indication of the size of the set of data.

13. The apparatus of claim 1, wherein the application generates a stream of sequential data.

14. A non-transitory, computer-readable medium storing code comprising instructions which, when executed by a processor of an electronic device, cause the electronic device to:
transmit, to a host system, an indication of a data size corresponding to a quantity of physical pages that are addressable by individual first-level pages of a first-level page table for mapping logical addresses to respective physical pages of a plurality of physical pages, wherein a target packet size for an application at the host system is based at least in part on the data size;
receive, from the host system based at least in part on transmitting the indication, a set of data associated with the application and a command to write the set of data to a memory device, a size of the set of data being the target packet size and the command comprising a logical address for the set of data;
identify, based at least in part on the logical address, a second-level entry of a second-level page table, wherein the second-level entry of the second-level page table points to a first-level page of the first-level page table, and wherein first-level entries of the first-level page map a set of logical addresses to a set of physical addresses, the set of logical addresses comprising the logical address; and write, based at least in part on identifying the second-level entry, the set of data to the set of physical addresses beginning at a first physical address corresponding to a lowest logical address mapped to by a lowest level page of the first-level page table and ending at a second physical address corresponding to a highest logical address mapped to by the lowest level page of the first-level page table.

15. The non-transitory, computer-readable medium of claim 14, wherein the command comprises the logical address for the set of data that is aligned to an integer multiple of the target packet size.

16. The apparatus of claim 1, wherein the controller is further configured to cause the apparatus to:
configure a buffer based at least in part on sending the indication of the data size to the host system, wherein a size of the buffer is the target packet size.

17. The apparatus of claim 16, wherein the controller is further configured to cause the apparatus to:
receive, from the host system, an indication of a buffer configuration, wherein the buffer is in accordance with the buffer configuration.

* * * * *